US 7,957,873 B2

(12) United States Patent
Cawthorne et al.

(10) Patent No.: US 7,957,873 B2
(45) Date of Patent: Jun. 7, 2011

(54) VEHICLE TRANSMISSION SHIFT INHIBIT METHOD AND APPARATUS

(75) Inventors: William R. Cawthorne, Milford, MI (US); Leonard G. Wozniak, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1056 days.

(21) Appl. No.: 11/684,055

(22) Filed: Mar. 9, 2007

(65) Prior Publication Data
US 2008/0221763 A1 Sep. 11, 2008

(51) Int. Cl.
*G06F 7/00* (2006.01)
*G06F 17/00* (2006.01)

(52) U.S. Cl. .......... 701/62; 701/22; 701/51; 701/87

(58) Field of Classification Search ........ 701/22, 701/51, 87, 62; 475/5, 10, 207, 218, 302; 180/65.1, 65.2, 165
See application file for complete search history.

(56) References Cited

U.S. PATENT DOCUMENTS

| | | | |
|---|---|---|---|
| 4,638,690 A * | 1/1987 | Hattori et al. .......... | 477/125 |
| 4,955,257 A * | 9/1990 | Terayama et al. ....... | 477/154 |
| 5,390,566 A * | 2/1995 | Kimura et al. .......... | 477/161 |
| 5,647,819 A * | 7/1997 | Fujita et al. ........... | 477/140 |
| 5,893,894 A * | 4/1999 | Moroto et al. .......... | 701/53 |
| 6,049,750 A * | 4/2000 | Adachi et al. .......... | 701/51 |
| 6,052,639 A * | 4/2000 | Ashizawa et al. ....... | 701/55 |
| 6,246,940 B1 * | 6/2001 | Ochiai et al. .......... | 701/51 |
| 6,259,984 B1 * | 7/2001 | Kanzaki et al. ........ | 701/51 |
| 6,447,417 B2 * | 9/2002 | Kanehisa .............. | 475/5 |
| 6,873,895 B2 * | 3/2005 | Nagano ............... | 701/69 |
| 7,749,130 B2 * | 7/2010 | Muta et al. ........... | 477/3 |
| 2003/0109969 A1 * | 6/2003 | Yamaguchi et al. ...... | 701/22 |
| 2004/0229726 A1 * | 11/2004 | Wilde et al. .......... | 477/99 |
| 2005/0077877 A1 * | 4/2005 | Cawthorne ............ | 320/128 |
| 2005/0080523 A1 * | 4/2005 | Bennett et al. ........ | 701/22 |
| 2005/0080537 A1 * | 4/2005 | Cawthorne et al. ...... | 701/51 |
| 2005/0080538 A1 * | 4/2005 | Hubbard et al. ........ | 701/54 |

\* cited by examiner

*Primary Examiner* — Khoi Tran
*Assistant Examiner* — Jorge O Peche
(74) *Attorney, Agent, or Firm* — Quinn Law Group, PLLC

(57) ABSTRACT

A control method is provided including detecting transmission output speed and a forward and reverse shift request, and executing inhibit limits when the detected speed exceeds a predetermined threshold speed. The inhibit limits slow the output speed to zero upon detection of a shift request at output speeds above the threshold, with a pedal progression map executed upon reaching zero output speed. The limits approach zero output torque as vehicle speed increases, reaching zero at a relatively high speed and simulating a neutral transmission upon a detected shift request at high speed. A vehicle is also provided having a transmission, a sensor for detecting transmission output speed, a sensor for detecting a shift request, and a PCM having an algorithm and a threshold transmission output speed. The algorithm inhibits a shift event in the direction opposite that of vehicle travel upon detection when vehicle speed is greater than the threshold.

12 Claims, 2 Drawing Sheets

VEHICLE TRANSMISSION SHIFT INHIBIT METHOD AND APPARATUS

TECHNICAL FIELD

The present invention pertains generally to a vehicle transmission control method enabling a smooth forward or reverse shifting event, and more particularly to a method for inhibiting an immediate shifting event or gear shift when an operator of a vehicle requests a shifting event in a direction opposite the vehicle's direction of travel.

BACKGROUND OF THE INVENTION

Vehicle transmissions include various gear positions or settings, commonly denoted as PRNDL for park, reverse, neutral, drive, and low drive, respectively. The PRNDL settings are selectable by a vehicle operator by moving a shift lever or other shift mechanism to thereby command or initiate a shift request. When shifting into reverse, for example, conventional or mechanically geared vehicle transmissions generally require moving or shifting a gear arrangement into a particular configuration suitable only for the reverse operation, i.e. vehicle propulsion in the rearward direction. With such conventional transmissions, the engine, which rotates or spins in only one direction, must provide rotational force or torque to propel the vehicle in both forward and reverse operating directions. Thus, reverse gearing must be configured to alter the direction of engine rotation at the output of the transmission.

Therefore, with conventional transmissions the reverse shift is prevented under certain circumstances. For example, if the vehicle is moving forward at a particular speed in excess of a predetermined threshold speed, reverse shifts may be disabled or prevented so as to protect the engine and/or transmission from excessive shift shock. Likewise, when the vehicle is traveling at a relatively high rate of speed in a reverse direction, a "forward/drive" shift request may be disabled or prevented. Such shift control functionality may be provided using integrated transmission controls or other methods and/or control devices suitable for preventing the shifting event.

In contrast to vehicles having a conventional transmission, hybrid vehicles are alternately or concurrently powered by an engine and/or one or more electric motor/generators, with forward and reverse operations typically achieved without specific gearing changes or shifting. In such hybrid transmissions, forward and reverse operations are achieved with the same mechanical configuration within the transmission. For example, "forward/drive" is achieved by commanding transmission output torque in a positive direction, while "reverse" is achieved by commanding transmission output torque in a negative direction. Therefore, unlike many conventional transmissions, hybrid transmissions may execute a reverse shift under limited forward operating conditions, or a forward shift under limited reverse operating conditions. However, both conventional and hybrid transmission control methodologies may be less than optimal when operating under certain drive conditions, particularly when the vehicle is traveling at a relatively high rate of speed.

SUMMARY OF THE INVENTION

Accordingly, a method is provided for controlling a vehicle transmission including recording a threshold transmission output speed, detecting the actual output speed of the transmission, detecting a shift request, comparing the detected and threshold output speeds, and executing a normal pedal progression map when the detected output speed is less than or equal to the threshold output speed. The method also executes a pair of inhibit limits or curves when the detected output speed is greater than the threshold output speed. The inhibit limits are configured to inhibit or delay a shift in the direction opposite the direction of travel when the detected output speed exceeds the threshold output speed by slowing the vehicle until the detected output speed drops below the threshold output speed.

In one aspect of the invention, the method includes configuring the vehicle with a speed sensor, a shift sensor, and a powertrain control module (PCM), sensing the transmission output speed using the speed sensor and relaying the detected output speed to the PCM, and sensing the shift request using the shift sensor and relaying the detected shift request to the PCM.

In another aspect of the invention, the inhibit limits gradually slow the transmission output speed to zero upon detection of the shift request, and the PCM executes a corresponding forward or reverse pedal progression map to enable a shift upon reaching the threshold output speed.

In another aspect of the invention, the inhibit limits gradually approach zero output torque as vehicle speed increases, reaching zero output torque at a relatively high rate of vehicle speed, thereby simulating a neutral condition of the transmission upon a detected shift request at a relatively high rate of forward or reverse vehicle speed.

In another aspect of the invention, a vehicle is provided having a transmission with a detectable actual output speed, a speed sensor operable for detecting the actual output speed, a shift sensor operable for detecting a shift request, and a PCM having a stored threshold output speed value. The PCM has a stored algorithm for inhibiting an immediate shift when the shift request is in the direction opposite the direction of vehicle travel and when the detected actual output speed is greater than the stored threshold output speed value.

In another aspect of the invention, the vehicle includes a forward and reverse set of shift inhibit limits. The PCM is operable for selecting the forward set when the detected output speed is greater than the stored threshold output speed value and the vehicle is traveling in the reverse direction, and for selecting the reverse set of inhibit limits when the detected output speed is greater than the stored threshold output speed value and the vehicle is traveling in the forward direction.

In another aspect of the invention, the inhibit limits gradually approach zero output torque as the vehicle speed increases, reaching zero output torque at a relatively high rate of vehicle speed, thereby simulating a neutral condition upon detecting a shift request at a relatively high rate speed.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
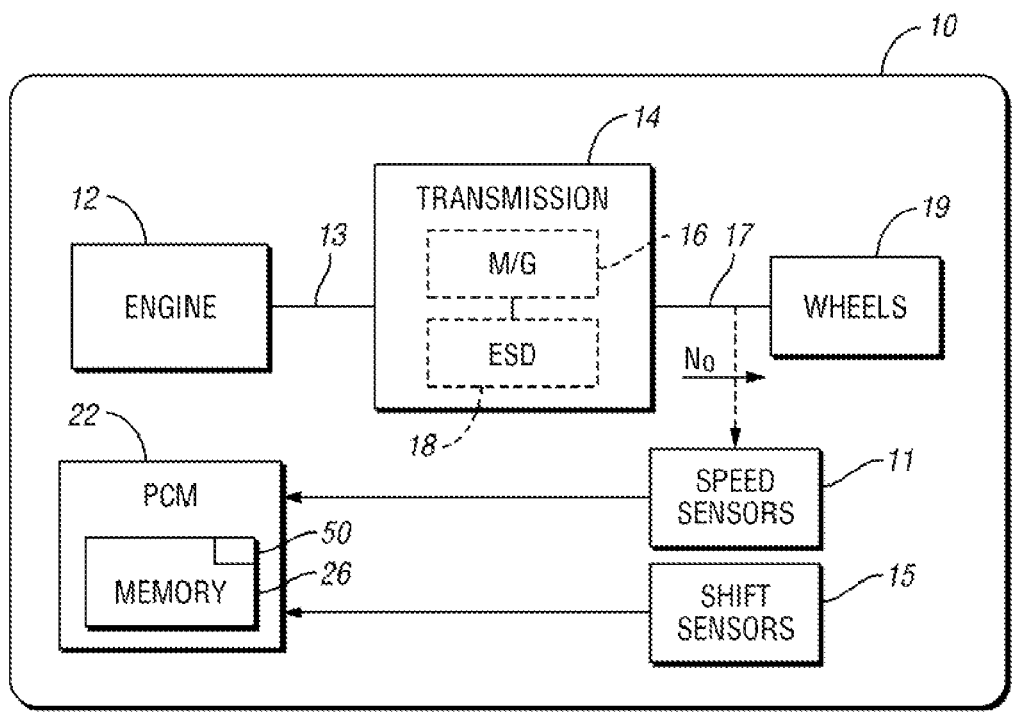
FIG. 1 is a schematic graphical illustration of a vehicle in accordance with the present invention.

Referring to the drawings, wherein like reference numbers refer to like components, there is shown in FIG. 1 a schematic illustration of a vehicle 10 in accordance with the present invention. Vehicle 10 includes an engine 12 having an engine output shaft 13 operatively connected to a transmission 14. The transmission 14 may be a conventional or mechanical/geared transmission, a continuously variable transmission, or alternately may be a hybrid transmission having includes at least one electric motor/generator 16, shown in phantom in FIG. 1 and represented therein as "M/G" for simplicity. In such an alternate hybrid configuration, motor/generator 16 is powered by an energy storage device (ESD) 18, for example a rechargeable battery or battery pack, when motor/generator 16 is acting in its capacity as a motor, and is operable for recharging ESD 18 when operating in its capacity as a generator. Transmission output shaft 17 imparts or transfers an actual transmission output speed, represented as arrow $N_o$, to a set of wheels 19 to thereby propel or drive vehicle 10.

A controller or powertrain control module (PCM) 22 is operatively connected to engine 12 and transmission 14. PCM 22 is in communication with the transmission 14 by way of a speed sensor 11 and a shift sensor 15, with sensors 11 and 15 being respectively configured, adapted, and/or programmed to sense the actual transmission output speed ($N_o$) and a transmission shift request, such as an attempted movement of a gear shift mechanism (not shown). PCM 22 further includes memory 26 having a control method or algorithm 50 (see FIG. 2), as described hereinbelow, which is configured or programmed to execute a shifting event, i.e. a shift into "forward/drive" or "reverse", when vehicle 10 is operating or traveling in the direction opposite that of the intended shift. That is, algorithm 50 inhibits an immediate or instantaneous shift into "forward/drive" or "reverse" by executing a gradual, controlled deceleration of vehicle 10 when a driver or operator of vehicle 10 selects or attempts to shift to "forward/drive" or "reverse" during a relatively high rate of vehicle speed in the opposite direction. The period of gradual deceleration is then sustained until a threshold transmission output speed value is reached, at which point PCM 22 can launch or execute the shifting event, and then proceed to execute previously stored or programmed forward and reverse pedal progression maps, as will be described later hereinbelow. The rate of deceleration is preferably selected to provide optimal comfort to a vehicle occupant, and also preferably low enough such that the engine 12 and transmission 14 are not subjected to excessive force or shift shock.

Figure 3:
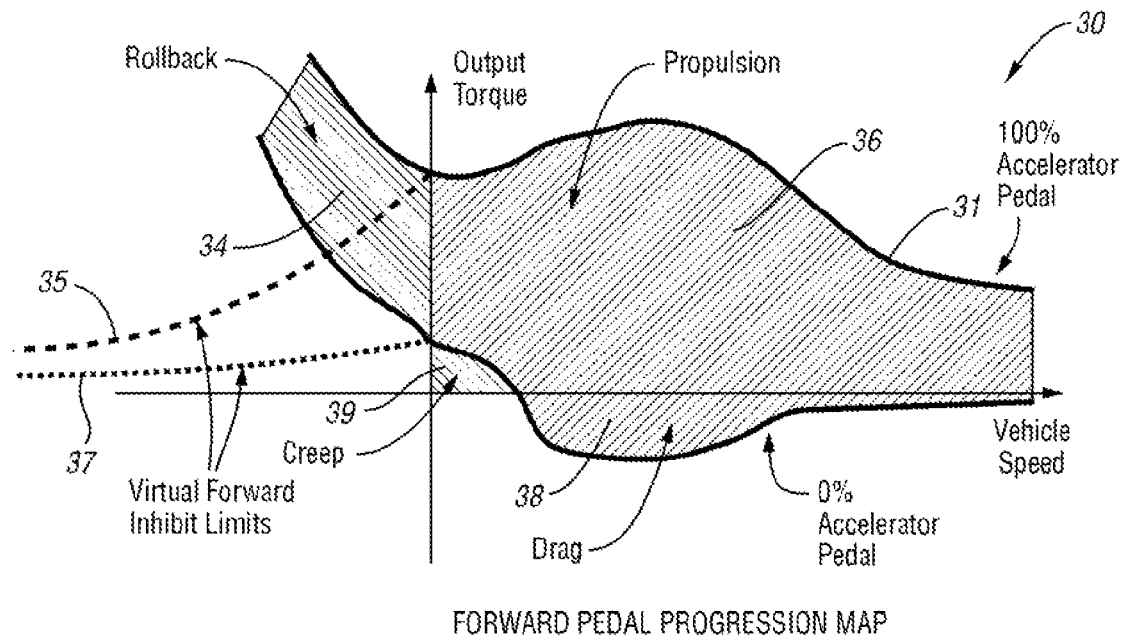
FIG. 3 is a schematic graphical representation of a forward pedal progression map having a set of forward shift inhibit limits.

Turning to FIG. 3, a forward pedal progression map 30 is shown that may be used with vehicle 10 of the present invention when vehicle 10 is operating in a "forward/drive" condition. In forward map 30, "output torque" is arranged or positioned along the Y-axis, and "vehicle speed" is arranged or positioned along the X-axis. As will be understood by those of ordinary skill in the art, a "pedal progression map" is a map of the amount of axle or transmission output torque requested or commanded for a particular accelerator position and/or a particular vehicle speed. Such pedal progression maps are commonly embodied as two-dimensional lookup tables which may be rapidly accessed by a controller such as PCM 22 of the present invention. Forward map 30 is bounded from above by 100% or fully depressed accelerator pedal position (curve 31), i.e. "full open" throttle, and from below by 0% accelerator pedal position (curve 32). The shape of curves 31 and 32 may be contoured according to the specific design parameters of transmission 14 (see FIG. 1), and therefore may vary depending on the design of the transmission 14. However, regardless of transmission design, curves 31 and 32 generally define four pedal progression regions 34, 36, 38, 39 with respect to the intersecting X and Y axis.

Region 34 describes a first "rollback" region or operating condition. Region 34 is a region in which an increasing torque is commanded in the direction of intended, i.e. forward, motion as vehicle 10 increases its speed in the direction opposite the intended motion. For example, rollback region 34 may execute when vehicle 10 is rolling backward with transmission 14 in "drive". While in region 34, PCM 22 commands an increasing torque suitable for slowing the rate of rollback.

Next, region 36, which is the largest region of forward map 30, represents a "propulsion" operating condition. Region 36 is a region in which torque is commanded in the direction of intended motion to thereby accelerate vehicle 10 or to maintain an existing speed. As vehicle speed increases, the output torque required to maintain vehicle speed eventually drops to a relatively constant value, as indicated by the shape of curve 31. Below propulsion region 36, and below the X-axis, is a third or "drag" region 38. Region 38 is a region or operating condition in which torque is commanded opposite the direction of intended motion in order to slow vehicle 10 when the accelerator pedal (not shown) is near zero or unapplied, in order to simulate a condition of engine drag.

Finally, region 39 represents a "creep region", or a region or operating condition in which a small amount of torque is commanded in the direction of intended motion during relatively low vehicle speeds and low accelerator pedal apply level or percentage of apply capacity, so that vehicle 10 moves in the intended direction. For example, creep region 39 may be entered when vehicle 10 is executing low speed maneuvers, such as while entering a garage.

Figure 2:
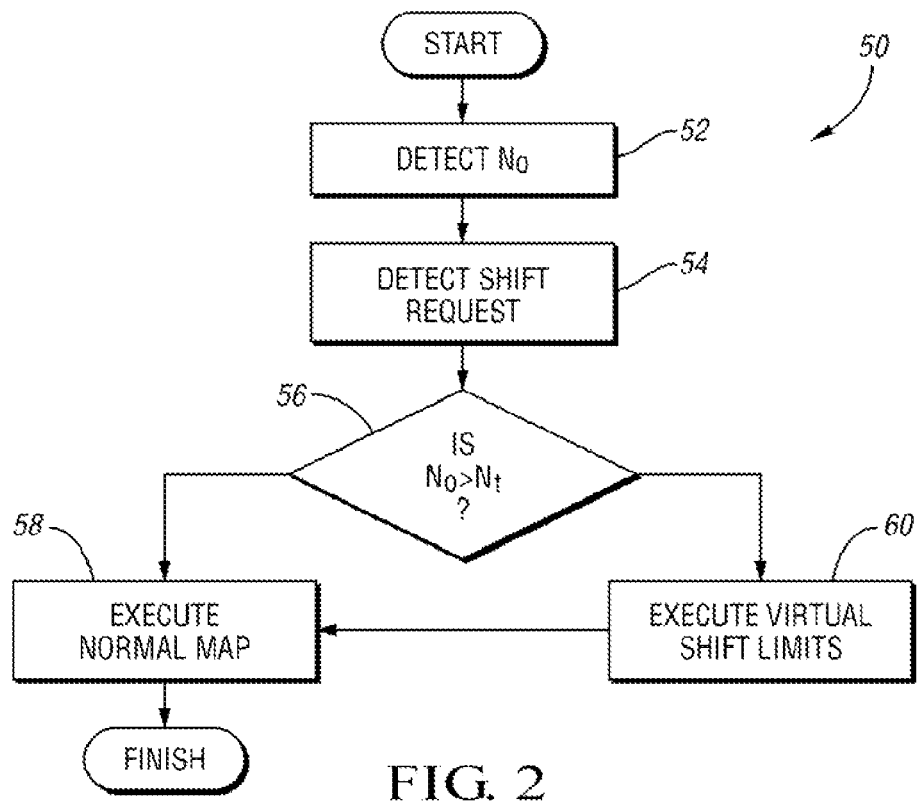
FIG. 2 is a schematic flow chart illustrating the preferred method or algorithm of the invention.

Turning to FIG. 2, the method or algorithm 50 of the invention preferably initiates upon start-up of vehicle 10. Beginning with step 52, algorithm 50 detects the actual transmission output speed ($N_o$) of transmission output 17, and temporarily stores or records the detected output speed ($N_o$) in memory 26. Detection of transmission output speed ($N_o$) may be accomplished using one or more speed sensors 11, which mechanically and/or electrically detect transmission output speed ($N_o$) and transmit the measured or detected speed value to PCM 22. Speed sensor 11 is any sensor equipped to directly and/or indirectly detect or sense the actual transmission output speed ($N_o$), such as by detecting a throttle command or pedal position/percent of apply of a vehicle throttle or accelerator pedal (not shown), and/or by directly or indirectly measuring rotational speed of transmission output 17. After transmission output speed ($N_o$) has been detected, algorithm 50 then proceeds to step 54.

In step 54, algorithm 50 detects a shift request, i.e. an operator-initiated request to shift the transmission 14 (see FIG. 1) into "forward/drive" or "reverse" when vehicle 10 is traveling in a direction opposite that of the requested shift. Detection of a shift request may be accomplished using one or more shift sensors 15 which mechanically and/or electrically detect the shift request and transmit the detected shift request to PCM 22, where it is temporarily stored or recorded in memory 26. If no shift request is detected, algorithm 50 remains in step 54, and in a "forward/drive" or "reverse" operating condition according to forward map 30 (see FIG. 3)

or reverse map 40 (see FIG. 4), respectively, until such a shift request is detected. Once detected, algorithm 50 proceeds to step 56.

In step 56, the algorithm 50 compares the detected actual transmission output speed ($N_o$) (see step 52) to a maximum or threshold transmission output speed, labeled in FIG. 2 as $N_t$, which is stored in memory 26. Memory 26 of PCM 22 is preferably preloaded or programmed with the threshold output speed value ($N_t$), which is preferably determined during pre-production vehicle development and testing, and which may vary depending on the specific design parameters of a given transmission 14. For example, in a conventional transmission, it may be preferable to set the threshold output speed ($N_t$) at zero to minimize shift shock, while a low but non-zero threshold output speed ($N_t$) may be used in conjunction with a hybrid transmission. Threshold output speed ($N_t$) is a speed below which algorithm 50 may efficiently and/or smoothly execute a forward or reverse pedal progression map, as discussed later hereinbelow with reference to step 58 and FIG. 4, after executing the requested shifting event. If the detected transmission output speed ($N_o$) is less than or equal to the stored threshold output speed ($N_t$), algorithm 50 proceeds to step 58. If, however, the detected transmission output speed ($N_o$) is greater than the threshold output speed ($N_t$), algorithm 50 proceeds to step 60.

In step 58, algorithm 50 executes a normal forward or reverse pedal progression map 30 and 40, respectively (see FIGS. 3 and 4, respectively), as determined by the direction of travel of vehicle 10. That is, if vehicle 10 is traveling in "forward/drive", the pedal progression is governed by forward map 30 (see FIG. 3), and likewise, if vehicle 10 is traveling in "reverse", the pedal progression is governed by a reverse map 40 (see FIG. 4). The algorithm 50 then continues operating within forward map 30 or reverse map 40 until a shifting event in the opposite direction is requested.

In step 60, which as explained above is executed if algorithm 50 determines that the detected transmission output speed (No) is greater than the threshold output speed ($N_t$) (see step 56), algorithm 50 executes or imposes a set of separate or virtual "shift inhibit limits" before proceeding to step 58, with step 60 inhibiting or delaying the immediate shifting event. Steps 58 and 60 are best described together, with reference to FIGS. 3 and 4.

Figure 4:
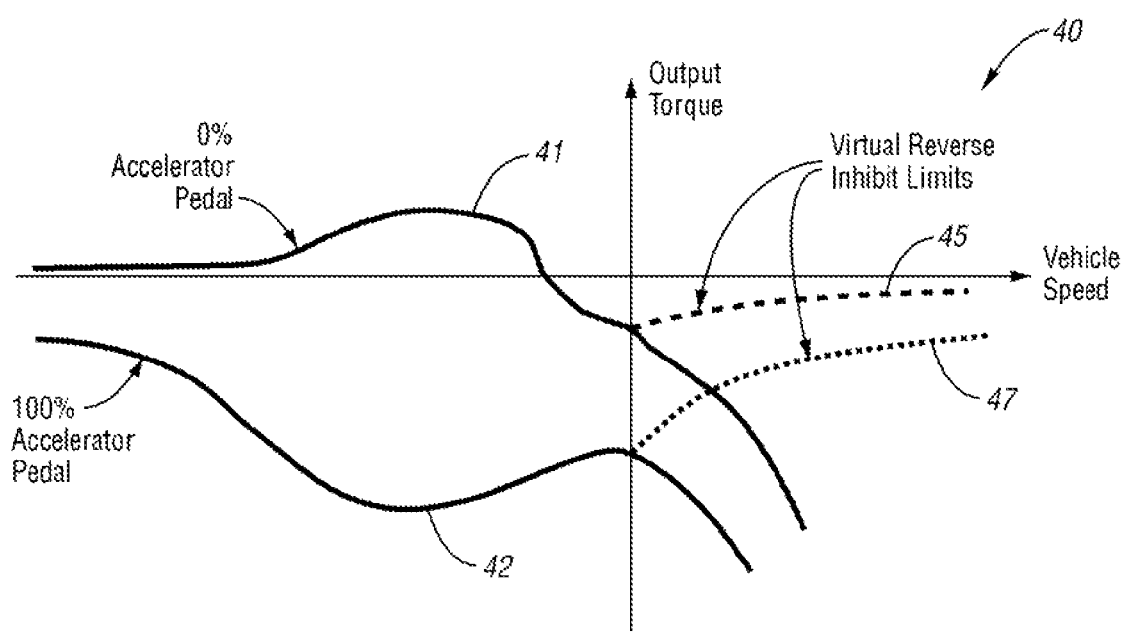
FIG. 4 is a schematic graphical representation of a reverse pedal progression map having a set of reverse shift inhibit limits.

Turning to FIG. 4, a "reverse pedal progression map" or reverse map 40 according to the invention is shown. As with the previously described forward map 30 of FIG. 3, reverse map 40 is bounded from above by 100% or fully depressed accelerator pedal position (curve 41), i.e. "full open" throttle, and bounded from below by 0% accelerator pedal position (curve 42). The shape of curves 41 and 42 may be contoured according to the specific design parameters of the transmission 14 (see FIG. 1). Reverse map 40 further includes an upper reverse inhibit limit or curve 45, and a lower reverse inhibit limit or curve 47.

As those of ordinary skill in the art will appreciate, transitioning immediately from forward map 30 of FIG. 3 to curves 41 and 42 of reverse map 40 (see FIG. 4) immediately upon movement of a shift lever (not shown) from "forward/drive" to "reverse" would not provide an optimally smooth and efficient shifting event under most vehicle speeds above a minimal or zero predetermined threshold speed ($N_t$). Therefore, in accordance with the invention, curves 45 and 47 are imposed on curves 41 and 42 of map 40.

When vehicle 10 is moving in a forward direction according to forward map 30 and an operator selects or shifts to "reverse", PGM 22 selects reverse map 40, and moves from forward map 30 of FIG. 3 to reverse map 40 of FIG. 4 at the same vehicle speed. However, rather than attempting to directly apply or execute reverse map 40 under the same output torque, PGM 22 instead applies a gradually increasing negative torque along following curves 45 and 47 to counteract the positive torque of transmission output 17, and at a level that is sufficient to produce an acceptable and/or comfortable rate of deceleration to vehicle 10. In other words, PGM 22 utilizes the previously described algorithm 50 to impose curves 45 and 47 during positive speed conditions, and continues to impose curves 45 and 47 to the exclusion of curves 41 and 42, until vehicle 10 reaches the threshold output speed value ($N_t$) (see step 56), at or near a zero vehicle speed to thereby minimize any shift shock.

Curves 45 and 47 preferably flatten to or approach zero output torque at progressively higher vehicle speeds, thereby simulating a "neutral" operating condition at zero output torque and relatively high vehicle speeds. Once reaching the threshold output speed ($N_t$), PGM 22 executes the requested shifting event and continues operating according to reverse map 40. Within the scope of the invention, PGM 22 may be calibrated as desired, such as by modifying curves 41, 42, 45, and 47, in order to produce the desired shift effect for transmission 14.

Finally, similar forward inhibit limits 35 and 37 may be applied in the event vehicle 10 were to travel in a reverse direction at a high rate of speed, and an operator were to attempt to shift into "forward/drive". In such an event, rather than attempting to immediately switch to forward map 30 (see FIG. 3) at the corresponding vehicle speed point, a set of forward inhibit limits or curves 35 and 37 would be imposed. Once curves 35 and 37 have slowed or reduced the reverse speed below the threshold speed ($N_t$), PCM 22 (see FIG. 1) may then execute a shifting event into "forward/drive" and continue operating according to forward map 30, as previously described hereinabove.

In this manner, algorithm 50 may provide a smooth shifting event or transition between "reverse" and "forward/drive", and vice versa, when the vehicle 10 is moving, while maintaining propulsion capability throughout the transition, and even when the transition is made at a relatively high rate of speed. Additionally, algorithm 50 provides for improved "rock cycles" when an operator attempts to alternately "rock" a vehicle forward and backward, such as when attempting to gain traction, since seamless transitions are enabled from "forward/drive" to "reverse" and back.

While the best modes for carrying out the invention have been described in detail, those familiar with the art to which this invention relates will recognize various alternative designs and embodiments for practicing the invention within the scope of the appended claims.

The invention claimed is:

1. A method for controlling a transmission of a vehicle having an engine, wheels, and a powertrain control module (PCM) in communication with the transmission, wherein one side of the transmission is connected to the engine and the other side is connected to a transmission output shaft which transfers an actual transmission output speed to the wheels, the method comprising:

recording, via the PCM, a threshold transmission output speed;

detecting the actual output speed of the transmission using a speed sensor;

detecting a shift request of the transmission in the direction opposite that of the direction of travel of the vehicle using a shift sensor;

using the PCM to compare said detected actual output speed to said threshold transmission output speed; and executing, via the PCM:
a first pedal progression map in the direction of travel;
a second pedal progression map in a direction opposite the direction of travel for which the first pedal progression map is executed when said detected actual output speed is less than or equal to said threshold transmission output speed;
a set of shift inhibit limits, which are imposed on the second pedal progression map prior to executing the second pedal progression map and prior to executing the shift request, when said detected actual output speed is greater than said threshold transmission output speed; and
the shift request after reaching the threshold transmission output speed, thereafter continuing to operate according to the second pedal progression map;
wherein said shift inhibit limits inhibit a shift of the transmission by providing a gradual and controlled deceleration of the vehicle in response to said shift request by slowing the vehicle to below said threshold transmission output speed.

2. The method of claim 1, wherein said transmission is a hybrid transmission.

3. The method of claim 1, wherein said PCM is further configured for:
executing said shift inhibit limits by gradually slowing said actual transmission output speed to zero upon said detection of said shift request; and
executing said pedal progression map upon reaching said zero output speed, thereby enabling a smooth shifting event in response to said detected shift request.

4. The method of claim 3, wherein said inhibit limits gradually reduce the actual output torque of the transmission to approximately zero as vehicle speed increases in a direction opposite that of the shift request, reaching said approximately zero output torque prior to executing the shift request, thereby simulating a neutral condition of the transmission.

5. A method for inhibiting a shift in one direction in a transmission of a vehicle moving in the opposite direction, the vehicle having an engine, wheels, and a controller in communication with the transmission, wherein one side of the transmission is connected to the engine and the other side transfers an actual transmission output speed to the wheels via a transmission output shaft, the method comprising:
recording a threshold transmission output speed in said controller;
detecting the actual output speed of the transmission;
detecting a shift request in said one direction;
configuring the controller with a forward pedal progression map having a set of forward shift inhibit limits, and with a reverse pedal progression map having a set of reverse shift inhibit limits, said controller being configured to execute a shift of the transmission in said one direction in response to said shift request;
comparing said detected actual output speed to said threshold output speed; and
executing, via the controller, said forward inhibit limits, which are imposed on the forward pedal progression map prior to executing the forward pedal progression map and the shift request, when the opposite direction is the reverse direction, said detected actual output speed is greater than said threshold transmission output speed, and said one direction is the reverse direction;
executing, via the controller, said reverse inhibit limits, which are imposed on the reverse pedal progression map prior to executing the reverse pedal progression map and the shift request, when the opposite direction is the forward direction, said detected actual output speed is greater than said threshold transmission output speed, and the one direction is the forward direction; and
executing, via the controller, the shift request after reaching the threshold transmission output speed, thereafter continuing to operate according to the forward pedal progression map when the shift request is in the forward direction, and according to the reverse pedal progression map when the shift request is in the reverse direction;
wherein said forward and said reverse shift inhibit limits inhibit a immediate shift of the transmission by providing a gradual and controlled deceleration of the vehicle in response to said shift request by slowing the vehicle to below said threshold transmission output speed.

6. The method of claim 5, wherein said transmission is a hybrid transmission.

7. The method of claim 5, wherein said executing said forward and said reverse inhibit limits are configured to gradually slow the vehicle until said detected actual output speed reaches zero.

8. The method of claim 5, including configuring the vehicle with at least one speed sensor and at least one shift sensor, wherein said detecting said actual transmission output speed includes sensing said actual transmission output speed using said at least one speed sensor and relaying said detected actual transmission output speed to said controller, and wherein said detecting a shift request includes sensing said shift request using said at least one shift sensor and relaying said detected shift request to said controller.

9. A vehicle comprising:
an engine;
a transmission connected on one side to the engine, and having a transmission output shaft on another side, wherein the transmission output shaft has a detectable actual output speed;
a speed sensor operable for detecting said actual output speed;
a shift sensor operable for detecting a shift request in the direction opposite the direction of vehicle travel; and
a powertrain control module (PCM) having a stored threshold output speed value and an algorithm enabling a smooth shift event upon detection of said shift request when said detected actual output speed is greater than said threshold transmission output speed;
wherein the PCM is configured to:
automatically compare said detected actual output speed to said stored threshold output speed value;
execute a first pedal progression map in the direction of travel;
execute a second pedal progression map in the direction opposite the direction of travel for which the first pedal progression map is used when said detected actual output speed is less than or equal to said threshold output speed value;
impose a set of shift inhibit limits on the second pedal progression map, prior to executing the second pedal progression map and prior to executing the shift request, when said detected actual output speed is greater than said threshold transmission output speed; and
execute the shift event after executing the set of shift limits and after reaching the threshold transmission output speed, thereafter operating according to the second pedal progression map.

10. The vehicle of claim 9, including a forward and a reverse set of shift inhibit limits, wherein said PCM is operable for selecting said forward set of inhibit limits when said detected actual output speed is greater than said threshold transmission output speed and said direction of vehicle travel is the reverse direction, and for selecting said reverse set of shift inhibit limits when said detected actual output speed is greater than said threshold transmission output speed and said direction of vehicle travel is the forward direction.

11. The vehicle of claim 10, wherein each of said sets of inhibit limits approach zero output torque as the vehicle speed increases, reaching said zero output torque at a relatively high rate of vehicle speed, thereby simulating a neutral condition of said transmission upon said detected shift request at said relatively high rate of vehicle speed.

12. The vehicle of claim 11, wherein said transmission is a hybrid transmission.

* * * * *